United States Patent
Shah et al.

(10) Patent No.: US 12,353,510 B2
(45) Date of Patent: Jul. 8, 2025

(54) CONTEXT-AWARE OBSERVATIONAL ENTITY RECOGNITION AND CAPTURE

(71) Applicant: Microsoft Technology Licensing, LLC, Redmond, WA (US)

(72) Inventors: Shrey Nitin Shah, Redmond, WA (US); Timothy Christopher Franklin, Seattle, WA (US); Gerald Haslhofer, Bellevue, WA (US); Bryan John Miller, London (GB); Nabeel Shahzad, Seattle, WA (US); Eric Anderson, Seattle, WA (US); Bharath Cheluvaraju, Karnataka (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 622 days.

(21) Appl. No.: 17/391,466

(22) Filed: Aug. 2, 2021

(65) Prior Publication Data
US 2023/0033622 A1    Feb. 2, 2023

(51) Int. Cl.
    *G06K 9/00*       (2022.01)
    *G06F 18/24*      (2023.01)
    *G06Q 10/1093*    (2023.01)
    *G06V 30/19*      (2022.01)

(52) U.S. Cl.
    CPC ......... *G06F 18/24* (2023.01); *G06Q 10/1095* (2013.01); *G06V 30/19* (2022.01)

(58) Field of Classification Search
    CPC .............................. G06F 40/30; G06F 16/9535
    See application file for complete search history.

(56) References Cited

U.S. PATENT DOCUMENTS

| | | | |
|---|---|---|---|
| 9,697,290 B2 | 7/2017 | Hahn et al. | |
| 10,999,281 B2* | 5/2021 | Parikh | G06F 40/205 |
| 11,005,790 B2 | 5/2021 | Lenchner et al. | |
| 11,263,392 B1* | 3/2022 | Shetty | G06F 40/106 |

(Continued)

OTHER PUBLICATIONS

Hult, et al. "Overview of Microsoft Graph", Retrieved from: https://docs.microsoft.com/en-us/graph/overview, Apr. 16, 2021, 8 Pages.

(Continued)

*Primary Examiner* — Molly Wilburn
*Assistant Examiner* — Aidan Keup

(57) ABSTRACT

In non-limiting examples of the present disclosure, systems, methods and devices for generating searchable data structures using observational context data are provided. An indication to process observational context data surfaced by a local computing device may be received. The observational context data may comprise display data or audio data. The observational context data may be processed by a context analysis engine. A determination may be made of a current context type occurring on the local computing device. The current context type may be determined from a plurality of context types, each having a semantic data structure comprising a unique set of entity types. A canvas comprising a searchable data structure of the current context type may be generated and populated with objects having entity types corresponding to the current context type. A displayable representation of the canvas may be displayed.

20 Claims, 11 Drawing Sheets

(56) References Cited

U.S. PATENT DOCUMENTS

| | | | |
|---|---|---|---|
| 2011/0125743 A1 | 5/2011 | Immonen et al. | |
| 2016/0378861 A1* | 12/2016 | Eledath | G06V 20/52 |
| | | | 707/766 |
| 2018/0114177 A1 | 4/2018 | Somech et al. | |
| 2019/0340554 A1 | 11/2019 | Dotan-cohen et al. | |
| 2020/0092695 A1* | 3/2020 | Vigeant | H04N 7/15 |
| 2020/0125574 A1* | 4/2020 | Ghoshal | G06F 16/24573 |
| 2020/0150981 A1* | 5/2020 | Westberg | G06F 9/547 |
| 2021/0073293 A1 | 3/2021 | Fenton et al. | |

OTHER PUBLICATIONS

Wadden, et al., "Entity, Relation, and Event Extraction with Contextualized Span Representations", In Proceedings of the Conference on Empirical Methods in Natural Language Processing and the 9th International Joint Conference on Natural Language Processing, Sep. 8, 2019, pp. 5784-5789.

"International Search Report and Written Opinion Issued in PCT Application No. PCT/US22/036046", Mailing Date: Oct. 27, 2022, 11 Pages.

* cited by examiner

CONTEXT-AWARE OBSERVATIONAL ENTITY RECOGNITION AND CAPTURE

BACKGROUND

Users perform a variety of activities on computing devices that are associated with specific events (e.g., meeting events, research topic events). Unless users manually take notes while events are taking place and copy and paste objects from various applications that are utilized in engaging in those events into those notes, it is difficult to recall information from those events that may be useful for engaging in future events and completing future tasks. Manually taking notes while attending and/or completing events on computing devices is time consuming and takes away from engagement with the events themselves. Further, having to manually review notes to identify relevant content for new contexts is time consuming and non-intuitive when there are many different sets of notes on various topics.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the disclosure provide systems, methods, and devices for generating searchable data structures using observational context data. According to a first example, a computer-implemented method is provided. The computer-implemented method comprises: receiving an indication to process observational context data surfaced by a local computing device, wherein the observational context data comprises display data from an application displayed by the local computing device; processing the observational context data with a context analysis engine; determining a current context type occurring on the local computing device, wherein: the current context type is determined from a plurality of context types, and each of the plurality of context types has a semantic data structure comprising a unique set of entity types associated with a corresponding context type; generating a canvas comprising a searchable data structure of the current context type; inserting a first object from the application into the canvas, wherein the first object has a first entity type corresponding to the current context type; inserting a second object from the application into the canvas, wherein the second object has a second entity type corresponding to the current context type; and causing a displayable representation of the canvas to be displayed by the local computing device, wherein the displayable representation comprises the first object and the second object.

According to an additional example, a system is provided. The system comprises a memory for storing executable program code; and a processor, functionally coupled to the memory, the processor being responsive to computer-executable instructions contained in the program code and operative to: receive an indication to process observational context data surfaced by a local computing device, wherein the observational context data comprises display data from an application displayed by the local computing device; process the observational context data with a context analysis engine; determine a current context type occurring on the local computing device, wherein: the current context type is determined from a plurality of context types, and each of the plurality of context types has a semantic data structure comprising a unique set of entity types associated with a corresponding context type; generate a canvas comprising a searchable data structure of the current context type; insert a first object from the application into the canvas, wherein the first object has a first entity type corresponding to the current context type; insert a second object from the application into the canvas, wherein the second object has a second entity type corresponding to the current context type; and cause a displayable representation of the canvas to be displayed by the local computing device, wherein the displayable representation comprises the first object and the second object.

According to another example, a computer-readable storage device is provided. The computer-readable storage device comprises executable instructions that, when executed by a processor, assist with generating searchable data structures using observational context data, the computer-readable storage device including instructions executable by the processor for: processing the observational context data with a context analysis engine; determining a current context type occurring on the local computing device, wherein: the current context type is determined from a plurality of context types, and each of the plurality of context types has a semantic data structure comprising a unique set of entity types associated with a corresponding context type; generating a canvas comprising a searchable data structure of the current context type; inserting a first object from the application into the canvas, wherein the first object has a first entity type corresponding to the current context type; inserting a second object from the application into the canvas, wherein the second object has a second entity type corresponding to the current context type; and causing a displayable representation of the canvas to be displayed by the local computing device, wherein the displayable representation comprises the first object and the second object.

BRIEF DESCRIPTION OF THE DRAWINGS

Non-limiting and non-exhaustive examples are described with reference to the following figures.

DETAILED DESCRIPTION

Figure 1:
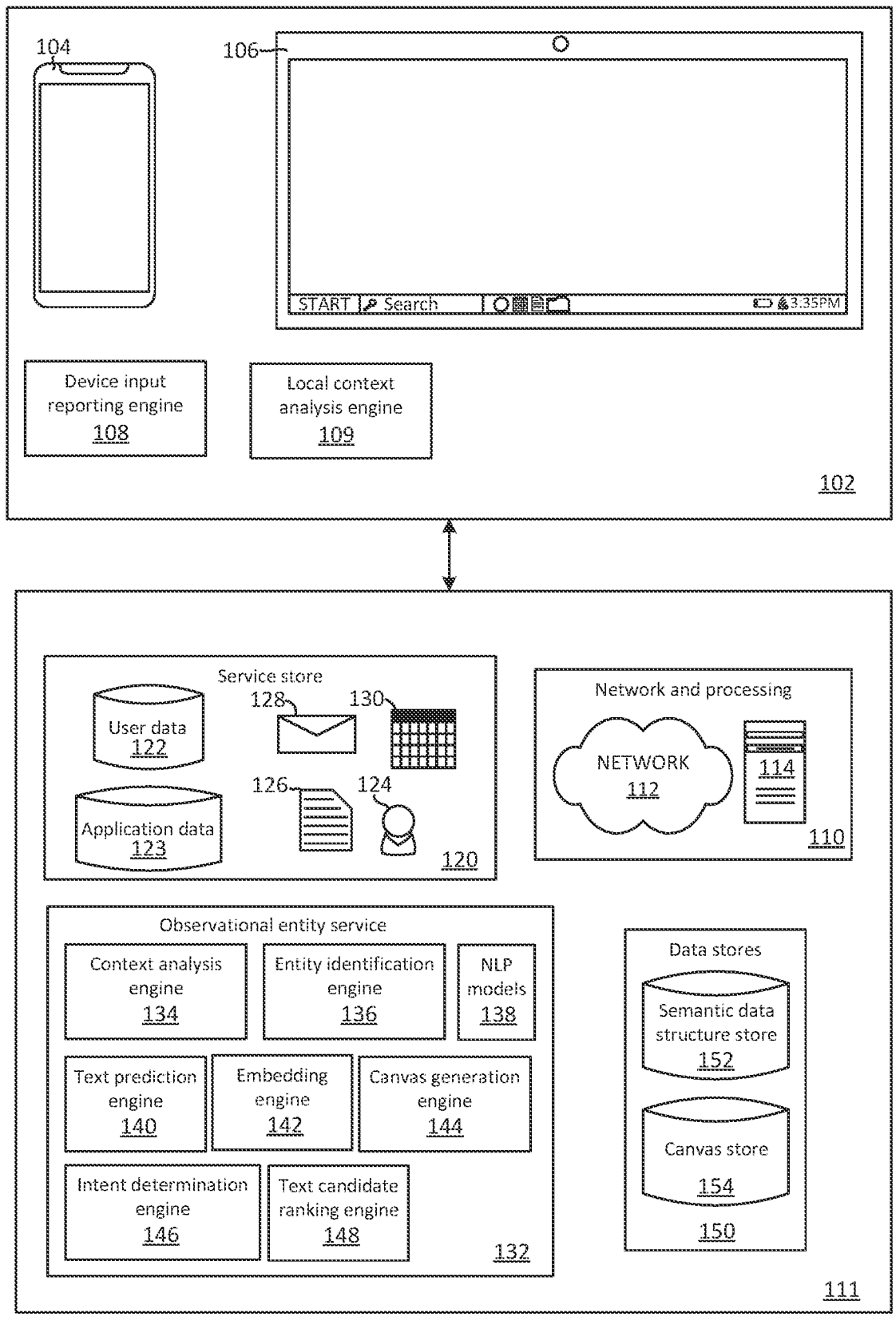
FIG. 1 is a schematic diagram illustrating an example distributed computing environment for generating searchable data structures using observational context data.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for generating searchable data structures using observational context data and surfacing data from those data structures in response to natural language inputs (e.g., user queries, text prediction, autofill) and automated queries. At least portions of the searchable data structures are displayable as interactive canvases. Observational context data, sometimes referred to herein as simply "context data", may comprise data generated or accessed by a local computing device that provides an indication of an activity or intent type that a user is engaging in on the local computing device. As examples, observational context data may comprise text data, voice input data (e.g., audio data), image data, application data, operating system data, and/or data associated with user interactions with objects, applications, and operating systems.

The observational context data may be processed locally or remotely by an observational context service. The observational context data may be processed to determine a current context type occurring on a local computing device that generated or accessed the observational context data. In some examples, due to privacy settings or concerns, the sensitive nature of the context data, and/or limited access to specific types of data, only the local computing device may have access to certain context data. The observational context data may be processed via an optical character recognition (OCR) engine to extract text, natural language processing models to classify text, neural networks (e.g., embeddings from neural networks, image neural networks to identify and classify images, audio neural networks to identify and classify audio, text neural networks to identify and classify text), and/or image to text models. In some examples, where the observational context service has direct access to the data and/or metadata generated or received by the local computing device, it may directly process and classify that data. The direct access may be provided via one or more application programming interfaces (APIs).

In some examples, if a user associated with a local computing device has provided authorization via privacy or processing settings, the observational context data may continuously or periodically be processed by the local computing device and/or the observational context service. In other examples, an indication to process the observational context data may need to be received to initiate the processing of the data that leads to the determination of a current context type. The indication may comprise one or more triggering events. For example, the indication may comprise the initiation of a meeting in an electronic meeting application, an opening of a new web browser application instance, or the opening of a different application. In other examples, the indication may comprise a manual user input comprising at least one of a selection of a user interface element, or the attaching of a displayable representation of a canvas to an application.

Once a determination is made of a current context type occurring on a local computing device, a canvas comprising a searchable data structure of the current context type may be generated. The current context type may be determined from a plurality of context types, where each of the plurality of context types has a semantic data structure comprising a unique set of entity types associated with a corresponding context type. As examples, a current context type may correspond to an electronic meeting type, a researching type, a researching specific topic type, a web browsing type, a web browsing a specific topic type, a work project type, a work project of a specific topic type, a banking task type, a finance task type, an education task type, a specific class task type, and specific class topic task type, among others.

The canvas may be populated with objects corresponding to the entity types of the semantic data structure for the current context type that have been extracted from one or more surfaces on a local computing device. In some examples, one or more embeddings may be generated for extracted objects and those embeddings may be associated with the objects in the canvas. In additional examples, objects in the canvas may be augmented with data that is related to the objects. The related data may be identified via automated queries performed by the observational context service.

A displayable representation of the canvas may be displayed on a local computing device. The displayable representation may be displayed while the observational context data is being processed and/or after the observational context data is being processed. In some examples, objects may be extracted from surfaces on the local computing device and populated for display in the displayable representation in real or near real time.

Canvases associated with a user account may be searched with automatically generated queries for the purpose of text prediction and/or with manual user queries. Objects, augmentation data related to objects, and/or summarizations of an event or topics included in a canvas that meet a threshold score related to a query or text input may be surfaced (e.g., displayed, audibly produced) by a computing device which generated the query or received the text input. The objects or augmentation data may be selected for inserting into a surface in which a query or text input was received.

The systems, methods, and devices described herein provide technical advantages for extracting data that is relevant to computing contexts and events, in addition to generating searchable semantic data structures utilizing that data. By automatically identifying local contexts and events occurring on local computing devices via local device processing, searchable data structures (e.g., canvases) that would not otherwise be possible to generate due to lack of data access may be generated via the mechanisms described herein.

Technical advantages are also provided via the normalization of data from a variety of surfaces (e.g., different applications, different operating system shell elements) into a single canvas for a current local context or event. The normalized data in the form of a structured canvas, which may include object embeddings, provides an advantageous surface for querying and returning suggestions to user queries and system queries. The canvases described herein may also be augmented with data related to extracted objects for specific semantic data structure types. The augmentation data may be surfaced for users based on contexts that the augmentation data is determined to be relevant for.

FIG. 1 is a schematic diagram illustrating an example distributed computing environment 100 for generating searchable data structures using observational context data. Distributed computing environment 100 includes local device sub-environment 102 and service sub-environment 111.

Local computing device sub-environment 102 includes mobile computing device 104, client computing device 106, device input reporting engine 108, and local context analysis engine 109. Service sub-environment 111 includes network and processing sub-environment 110, service store 120, observational entity service 132, and data stores 150. Although some of the operations, engines, models, and stores are primarily described in relation to either local computing device sub-environment 102 or service sub-environment 111, any of those operations, engines, models, and/or stores may be executed and/or maintained entirely locally, entirely remotely (e.g., cloud based), and/or partially locally and partially remotely.

Network and processing sub-environment 110 includes network 112 and server computing device 114. Network 112 may comprise a wired or wireless network. Any and all of the computing devices described herein may communicate with one another via a network, such as network 112. Server computing device 114 is illustrative of one or more server computing devices that may host the services and stores described herein. For example, server computing device 114 may host service store 120, observational entity service 132, and/or data stores 150.

Service store sub-environment 120 may include information associated with observational entity service 132 and/or one or more other applications or services. For example, service store sub-environment 120 may include application data associated with a plurality of applications. The application data may be stored in application data store 123. The aggregate information for a plurality of users associated with a productivity application suite and/or one or more other applications may be included in application data store 123. User data (e.g., account identifiers, user preferences, passwords) may be stored in user data store 122. In some examples, user data store 122 and application data store 123 may be comprised in a same data store.

User data store 122 may be associated with a plurality of user accounts, such as user account 124. User account 124 may have granted observational entity service 132 with access to the user's application data. User account 124 may additionally or alternatively be associated with one or more productivity application services. In this example, user account 124 is associated with an email application service, a word processing application service, and a calendar application service. As such, service store 120 includes electronic messages 128 associated with user account 124, electronic documents 126 associated with user account 124, and electronic calendar information 130 associated with user account 124. User data store 122 may include additional information from one or more other applications or services, such as SMS messaging applications or services, group messaging/collaboration applications or services, social media applications or services, web browser applications or services, task management applications or services, to-do list applications or services, map applications or services, reservation applications or services, presentation applications or services, and spreadsheet applications or services, for example. In some examples, user data store 122 may include information for user accounts associated with observational entity service 132.

Observational entity service 132 includes context analysis engine 134, entity identification engine 136, natural language processing (NLP) models 138, text prediction engine 140, embedding engine 142, canvas generation engine 144, intent determination engine 146, and text candidate ranking engine 148. Observational entity service 132 may perform operations associated with generating searchable data structures using observational context data and surfacing data from those data structures in response to natural language inputs (e.g., user queries, text prediction, autofill).

Observational entity service 132 may receive input data from local computing devices (e.g., mobile computing device 104, client computing device 106) via device input reporting engine 108. In examples, a user associated with a local computing device may have to affirmatively opt in for device input reporting engine 108 to collect input data and/or send input data to one or more services. Device input reporting engine 108 may receive keystroke inputs from a keyboard (e.g., a physical keyboard, a virtual keyboard) connected to a local computing device and send that data to observational entity service 132. Thus, the keystroke input data may be transformed into text data that may be processed by observational entity service 132.

Local context analysis engine 109 and context analysis engine 134 both process observational context data (sometimes referred to herein as simply "context data") to determine a current context on a local computing device. However, local context analysis engine 109 performs the processing on the local computing device where the observational context data is generated, and context analysis engine 134 performs the processing in the cloud. Observational context data may comprise data generated or accessed by a local computing device that provides an indication of an activity or intent type that a user is engaging in on the local computing device. Thus, observational context data may comprise text data, voice and other audio input data, image data, application data, and/or operating system interaction data.

In some examples, due to privacy settings or concerns, the sensitive nature of context data, and/or limited access to specific types of data, only local context analysis engine 109 may have access to certain context data. For example, local context analysis engine 109 may have access to data (e.g., display data, audio data) from a meeting application, but context analysis engine 134 may not have access to that data because the meeting application may not provide cloud-based API access to that data (or the underlying metadata). Local context analysis engine 109 may apply a machine learning model (e.g., embeddings from neural networks) to that data to identify and classify objects (e.g., text, meeting attendees, documents). In additional examples, text may be identified via application of an OCR engine by context analysis engine 109 to the context data to identify and extract the underlying text. As another example, settings associated with a web browser application or service may dictate that a cloud service is not provided with browsing history data for the web browser application or service. In some examples, the local system may not have access to the search inputs, metadata, and/or HTML data associated with a web browsing session, but the local computing device may still process web browser context data for a browsing session (assuming a user account has opted in via privacy settings) utilizing pixel and/or image data from displayed webpages. Local context analysis engine 109 may apply an OCR engine to that pixel data to identify and extract underlying text. In additional examples, local context analysis engine 109 may apply one or more neural networks to the pixel data to classify and/or identify text, images, and/or website and webpage types. In additional examples, context analysis engine 109 may process audio data from an application by processing the audio output by the application via a microphone integrated in or connected to a computing device executing context analysis engine 109. In some examples, that audio data may be transformed to text via a speech-to-text engine. In other examples, one or more objects in an application may be identified via the audio data. In additional examples, context analysis engine 109 may process audio data by performing speaker isolation operations whereby audio streams on the local computing device are segmented (even for mono audio sources) into speaker dependent transcripts. Thus, local context analysis engine 109 may process context data that is otherwise inaccessible to context analysis engine 134.

In addition to the OCR engine, the embedding neural networks, and the audio processing described above, local context analysis engine 109 and/or context analysis engine 134 may comprise website classification models (e.g., HTML classification models, webpage tag classification models, webpage domain classification models, webpage header classification models) text classification models (keyword or phrase classification models, embedding classification models, sent-2-vec, Bidirectional Encoder Representations from Transformers [BERT], Embeddings from Language Model [ELMo]), and/or accessibility software tool data classification models.

Utilizing context analysis engine 109 and/or context analysis engine 134, a current context type may be determined. The current context type may be determined from a set of context types. The set of context types may be stored in semantic data structure store 152. Each of the set of context types may correspond to activity and/or task types that are being performed on a local computing device. For example, a current context type may correspond to an electronic meeting type, a researching type, a researching specific topic type, a web browsing type, a web browsing a specific topic type, a work project type, a work project of a specific topic type, a banking task type, a finance task type, an education task type, a specific class task type, and specific class topic task type, among others.

In some examples, context types may be manually created by administrative users or developers of observational entity service 132. In other examples, context types may be automatically identified via collection and analysis of telemetry data, by statistical and/or machine learning models, from a plurality of computing devices and/or user accounts, and manually classified by administrative users of observational entity service 132. Each of the context types may have a semantic data structure comprising a unique set of entity types associated with a corresponding context type. In some examples, the semantic data structure for a context type may be manually and/or automatically determined. For example, an administrative user or developer may identify entity types for a context type and manually associate them with a context type in semantic data structure store 152. In additional examples, one or more statistical and/or machine learning models may automatically identify entity types for a context type and those automatically identified entity types may be manually or automatically associated with the context type in semantic data structure store 152.

In some examples, local context analysis engine 109 and/or context analysis engine 134 may bet set to constantly analyze context data that is available to them. In other examples, context analysis engine 109 and/or context analysis engine 134 may only analyze context data upon receiving a user input to do so. The user input may comprise an interaction with a user interface button, an application trigger, a voice input, a snapping of an application associated with observational entity service 132 to another application, or the opening of an application associated with observational entity service 132, among others.

Once a current context type is determined, canvas generation engine 144 may generate a canvas for capturing data associated with that local context type. In some examples, canvas generation engine 144 may automatically generate a canvas of the determined current context type upon the determination of the current context type being made. In other examples, canvas generation engine 144 may generate a canvas only upon receiving a user input to generate a canvas. The user input may comprise a variety of mechanisms. For example, a user may open an application associated with the observational entity service (e.g., a sticky note application, a note taking application), and that opening may cause canvas generation engine 144 to generate a canvas for the local context type. In other examples, the user input may comprise an interaction with a user interface button, an application trigger, a voice input, a snapping of an application associated with observational entity service 132 to another application, or the positioning of an application associated with observational entity service 132 proximate (on a user interface) to another application where context data is being generated. Once generated, the canvas may be stored in canvas store 154. In some examples, canvas store 154 may be associated with service store 120. A canvas may be accessed by one or more user accounts that have been granted access to the canvas by an administrative user associated with the canvas. In some examples, a canvas may be accessible only by a single user account. In other examples, a canvas may be accessible by groups of users (e.g., company groups based on an organizational chart, family groups based on family related family accounts or domains, custom groups based on tenancy rules).

Once a canvas has been generated for a current local context, entity identification engine 136 may identify and extract data (e.g., text objects, image objects, audio objects, video objects) corresponding to the entity types for a semantic data structure corresponding to the current local context. In some examples, that data may be directly input into a canvas. In other examples, the data may be normalized and/or transformed prior to being input into a canvas. For example, speech and/or text data may be summarized and summarizations corresponding to entity types for the semantic data structure may be input into a canvas. The extracted data and/or data that is input into a canvas may also be augmented. For example, if a user is identified in a meeting application (e.g., via a neural network, via voice analysis with an audio neural network), a determination of who that user is may be made and additional details associated with that user (e.g., email address, phone number, previous interaction data) may be included in the canvas with the identity of the user or user account.

As a specific illustrative example, if a current local context on a local computing device is determined to be a travel research for a specific location type, a travel research canvas may be generated, which may have a semantic data structure with a unique set of entity types corresponding to that local context. In examples, the entity types that are unique to that semantic data structure may include travel destination identity, airport identities, location data, airline names, flight times, hotel names, hotel dates, flight prices, hotel prices, rental car data, restaurant information at the destination, images of restaurants at the destination, images of menus for restaurants at the destination, among others. Entity identification engine 136 may identify and extract objects corresponding to those entities and input them in the canvas that has been generated for the current local context.

In some examples, embedding engine 142 may generate text, audio, and/or image embeddings for or related to one or more objects included in a canvas. Embedding engine 142 may be associated with or included in NLP models 138. NLP models 138 may comprise keyword matching models, key phrase matching models, and/or text embedding models. Embeddings generated by embedding engine 142 may be associated with a corresponding object in a canvas. A matrix comprised of embeddings from one or more canvases may then be utilized to process queries that are received by observational entity service 132. For example, if a natural language input is received by observational entity service 132 (e.g., via an application user interface or an operating system shell element), the natural language input may be processed with NLP models 138, a match score between the natural language input and at least one embedding may be determined, and if a match score is determined to be above a threshold value an object corresponding to the embedding may be surfaced (e.g., displayed, audibly produced). In additional examples, queries received by observational entity service 132 may be processed with keyword or phrase matching models that match words or phrases in a query to words or phrases included in a canvas. Additional details regarding embeddings and keyword and phrase matching models are provided below in relation to the description of NLP models 138.

In some examples, canvases associated with a user account may be searched with automatically generated queries for the purpose of text prediction. For example, if a user inputs text into an electronic surface on a local computing device, that text may be processed by text prediction engine 140 to determine whether there are one or more objects (e.g., text objects, image objects, audio objects, video objects) in a canvas associated with a user account that have a match score that exceed a threshold for surfacing for completing the text input or responding to the text input. In examples where observational entity service 132 is analyzing an active text input (e.g., a text input that is in the process of being entered, a user-provided text input that is in a currently active application window), text prediction engine 140 may generate one or more candidate text strings for completing the active text input. Text prediction engine 140 may comprise a neural model or an n-gram model. A predictive text neural model may receive a text input from an electronic surface (e.g., an application surface, a service surface, an operating system shell surface, a file surface) and generate one or more surfacing candidates based on processing the text input with the one or more neural network models. The surfacing candidates that are generated by a predictive text neural model may comprise one or more text characters, words, or punctuation that are determined to have at least a threshold likelihood of being selected by a user for following a text input. Examples of neural models that a predictive neural model may encompass include Generative Pre-Trained Transformers (GPT) (e.g., GPT2, GPT3), BERT, ELMo, and/or Recurrent Neural Networks (RNNs). A predictive text n-gram model may receive a text input from an electronic surface and generate one or more surfacing candidates based on processing the text input with the n-gram model (e.g., 2-gram, 3-gram, 4-gram). The surfacing candidates that are generated by a predictive text n-gram model may comprise one or more text characters, words, or punctuation that are determined to have at least a threshold likelihood of being selected by a user for following the text input.

Text candidate ranking engine 148 may apply a set of rules to text strings and other objects in canvas store 154 and text strings generated by text prediction engine 140 to determine which text strings or other objects to surface in relation to a received text input and/or automated query. Where objects in a canvas other than text strings are implicated, text strings associated with those objects may be queried. For example, image objects may be augmented with identities or other classifications that have been assigned and associated with them in a canvas. The one or more rules applied by text candidate ranking engine 148 may dictate that a text string or object with a highest match score be surfaced. In other examples, one or more rules may dictate that all text strings or objects with a match score over a specific threshold value be surfaced. In other examples, one or more rules may dictate that X or Y number of text strings or objects with highest match scores be surfaced. In additional examples, one or more rules may dictate that a text string or object in a canvas (e.g., in canvas store 154) with a match score over a threshold value may be surfaced even if a match score for a text string determined by text prediction engine 140 has a higher match score. In additional examples, a text candidate generated by text prediction engine 140 may be combined with at least a portion of a text string or object in a canvas, and the combined text string or text string-object may be scored for ranking by candidate ranking engine 148. In additional examples, intent determination engine 146 may be applied to a natural language input to determine an intent associated with the natural language input, the intent may be matched to one or more objects, or embeddings associated with objects, in canvas store 154, and those one or more objects may be surfaced (e.g., displayed, audibly produced) in response to the natural language input.

In some examples, queries received by observational entity service 132 may be matched to summaries of events included in canvases and those summaries may be surfaced (e.g., displayed, audibly produced) in response to the queries. Matching a query to a summary may comprise matching a natural language input to a summary itself or one or more embeddings associated with an object included in a canvas. As examples, summaries included in canvases that may be surfaced in response to queries may comprise text summaries (e.g., topical classifications, to-dos, assignments), image summaries (e.g., most prominent images from event, images related to topic accessed or discussed during event), video summaries (e.g., snippets of videos accessed or generated during event), and/or audio summaries (e.g., topical audio summary of event, audio snippet from audio accessed during event). The summaries may provide a "quick take" that hits a query and allows a user to dive deeper into related content. For example, a surfaced summary may be interacted with (e.g., mouse click(s), touch input, voice input) and additional content from a corresponding canvas may be surfaced.

Figure 2:
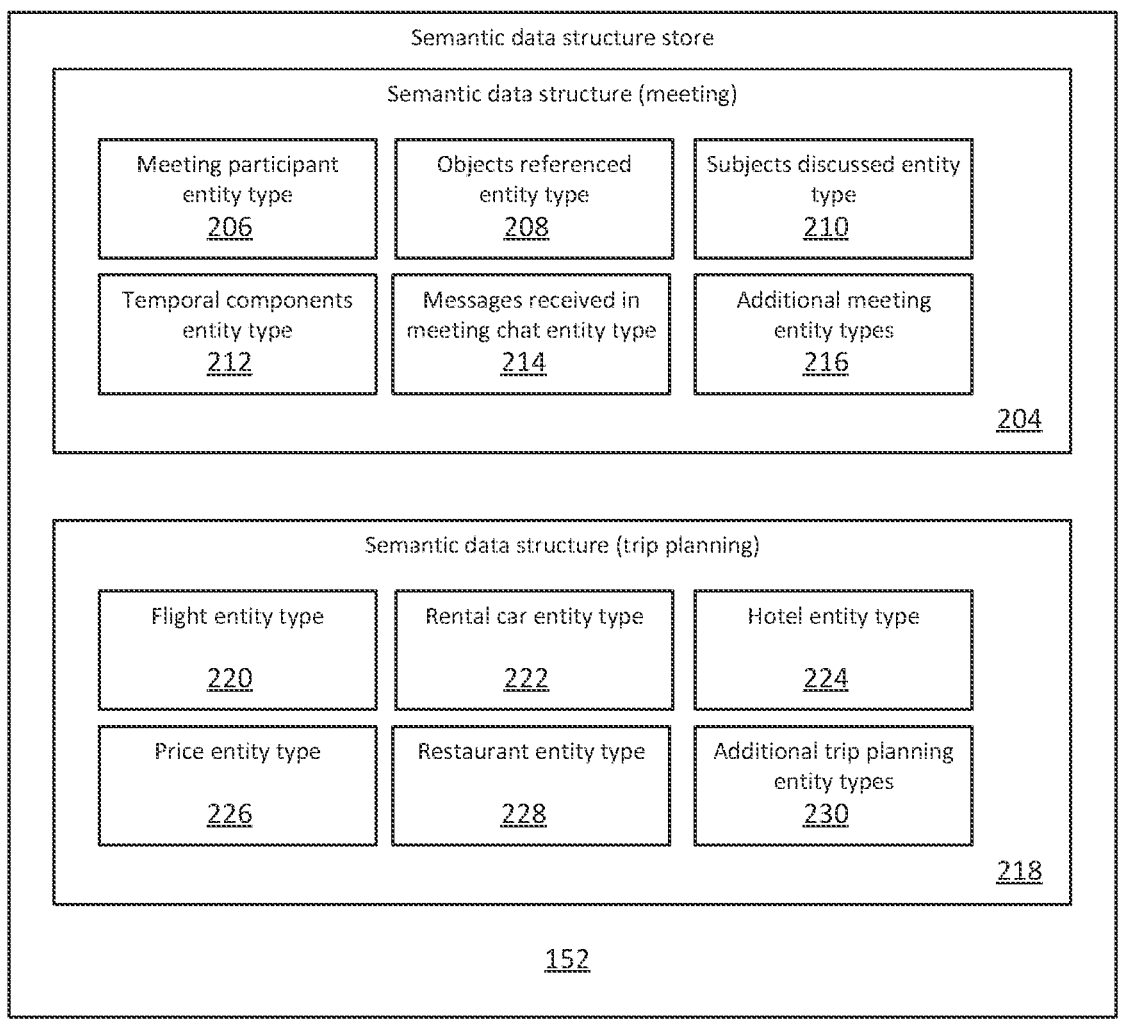
FIG. 2 is a block diagram illustrating an exemplary semantic data structure store.

FIG. 2 is a block diagram 200 illustrating an exemplary semantic data structure store 152. Semantic data structure store 152 includes first semantic data structure 204 and second semantic data structure 218. Although there are only two semantic data structures illustrated in semantic data structure store 152, it should be understood that there may be many more semantic data structures of various types included in semantic data structure store 152.

First semantic data structure 204 comprises a semantic data structure for a meeting context type. First semantic data structure 204 includes a plurality of exemplary entity types related to the meeting context type. Specifically, first semantic data structure 204 includes meeting participant entity type 206, objects referenced entity type 208, subjects discussed entity type 210, temporal components entity type 212, messages received entity type 214, as well as additional meeting entity types 216. Additional meeting type entity types 216 is representative of one or more additional entity types that may be included in a semantic data structure for a meeting context type. Thus, more or fewer entity types than those included in first semantic data structure 204 are contemplated. Additionally, while the illustrated entity types encompass broad categories, it should be understood that they may each include sub-entities that entity identification engine 136 may identify and extract objects for. For example, meeting participant entity type 206 may include sub-entities or other classifications such as "name", "identity", "email address", "contact information", among other sub-entities. In some examples, once an entity has been identified (e.g., a meeting participant), observational entity service 132 may identify additional information related to that entity (e.g., name, identity, email address, contact information) and augment the entity in the semantic data structure with that additional information. The additional information may be identified by searching one or more other canvases associated with a user account, searching data stores (e.g., service store 120) associated with a user account, and/or performing a web search related to the entity, for example.

Second semantic data structure 218 comprises a semantic data structure for a trip planning context type. Second semantic data structure 218 includes a plurality of exemplary entity types related to the trip context type. Specifically, second semantic data structure 218 includes flight entity type 220, rental car entity type 222, hotel entity type 224, price entity type 226, restaurant entity type 228, and additional trip planning entity types 230. Additional trip planning entity types 230 is representative of one or more additional entity types that may be included in a semantic data structure for a trip planning context type. Thus, more or fewer entity types than those included in second semantic data structure 218 are contemplated. Additionally, while the illustrated entity types encompass broad categories, it should be understood that they may each include sub-entities that entity identification engine 136 may identify and extract objects for. For example, flight entity type 220 may include sub-entities or other classifications such as "airline name", "airport name", "airport location", "flight time", and "flight duration", among other sub-entities. As discussed above, once an entity has been identified, observational entity service 132 may identify additional information related to that entity and augment the entity in the semantic data structure with that additional related information. The additional information may be identified by searching one or more canvases associated with a user account, searching data stores associated with a user account, and/or performing a web search related to the entity, for example.

Figure 3A:
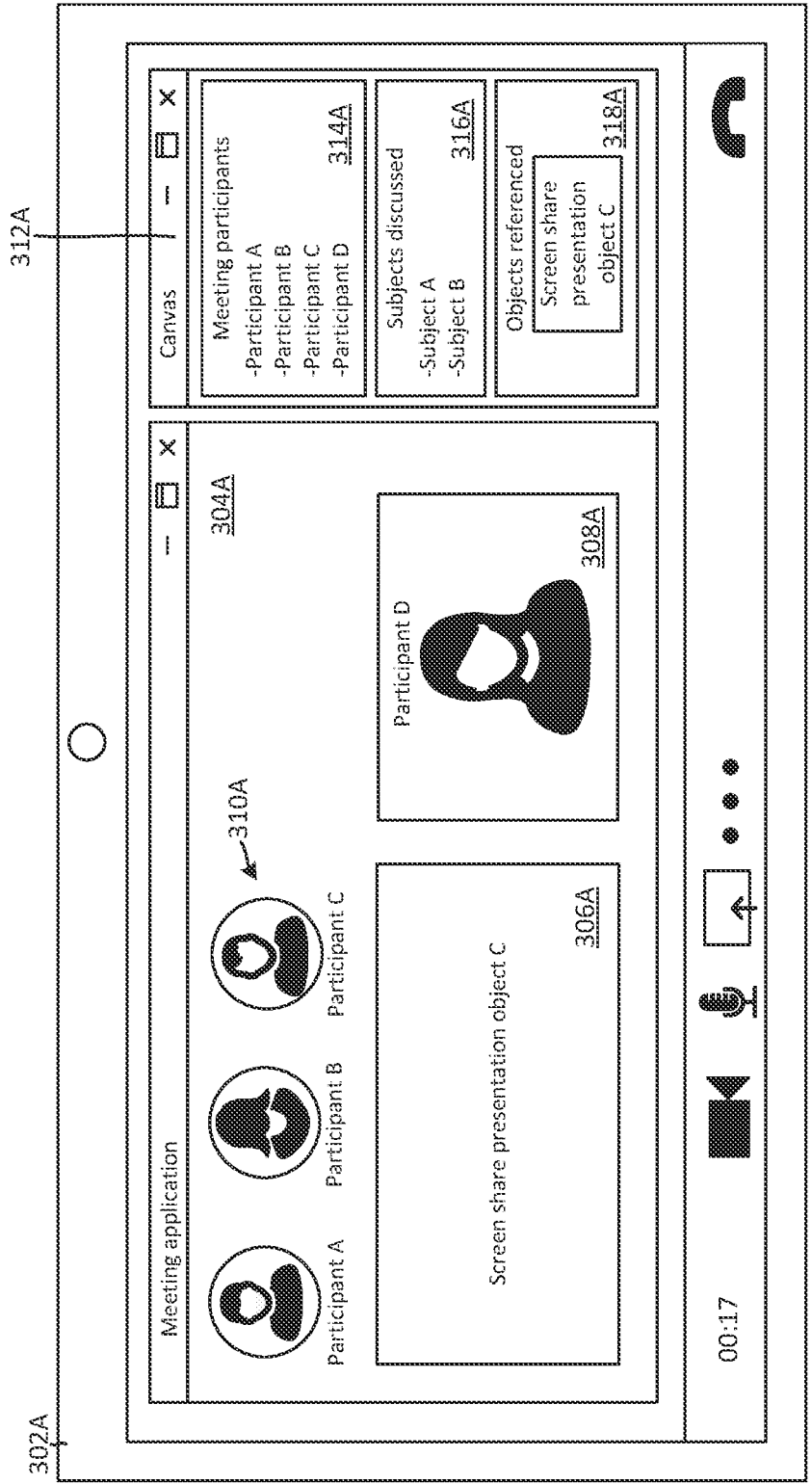
FIG. 3A is a diagram illustrating a computing device and an exemplary user interface for surfacing a displayable representation of a canvas including data related to a meeting application.

FIG. 3A is a diagram illustrating a computing device 302A and an exemplary user interface for surfacing a displayable representation of a canvas 312A including data related to a meeting application.

In this example, a user has opened an electronic meeting application as illustrated by application window 304A. A manual input by a user or a triggering event on computing device 302A may have initiated the opening of the displayable representation of canvas 312A, which is filled in with meeting entity object types during the duration of the meeting that is taking place. In this example, the displayable representation of canvas 312A is in the form of a sticky note application or widget. However, it should be understood that a canvas may be surfaced in any variety of displayable forms (e.g., a note taking application, a word processing document, a table format, a presentation document, an HTML document).

Application window 304A in which the meeting is taking place includes non-presenting participants 310A, presenting participant 308A, and screen share presentation object C 306A, which presenting participant 308A is currently presenting via the meeting application.

Observational entity service 132 may process observational context data from computing device 302A with local context analysis engine 109 and/or context analysis engine 134. Local context analysis engine 109 and/or context analysis engine 134 may apply context analysis models (e.g., embedding neural networks, image neural networks, audio neural networks, OCR models) to image data and audio data produced by computing device 302A. Thus, local context analysis engine 109 and/or context analysis engine 134 may determine based on that analysis and processing that a meeting application is open and a meeting is currently active in the meeting application. Observational entity service 132 may thus determine that the current context type on computing device 302A is a meeting context type. The meeting context type is included in semantic data structure store 152, and it has a semantic data structure comprising a unique set of entity types associated with it.

Based on the semantic data structure of the meeting context type, entity identification engine 136 may identify and extract objects corresponding to the entity types of the meeting context type semantic data structure. Examples of meeting type entities may include meeting participants, objects references, subjects discussed, temporal components, and messages received in a meeting chat, among others. The extracted objects may be saved to a canvas comprising a searchable data structure of the current context type (e.g., the meeting context type). In this example, a displayable representation of the canvas 312A is also displayed by computing device 302A.

Displayable representation of the canvas 312A includes meeting participants 314A, which includes the identities of the meeting participants that were identified via processing performed by local context analysis engine 109, context analysis engine 134, and/or entity identification engine 136. Those identities include participant A, participant B, participant C, and participant D. The canvas, and in some examples, the displayable representation of the canvas 312A may be augmented with additional information related to those meeting participants. Displayable representation of canvas 312A also includes subjects discussed 316A, which includes subject A and subject B. In some examples, those subjects may have been identified via processing of audio outputs received by a microphone integrated or connected to computing device 302A, and/or by speaker isolation audio processing. In additional examples, one or more messages related to the meeting may have been processed by NLP models 138 and the subjects may have been identified. The messages may have been identified and/or received by device input reporting engine 108 and/or an OCR model. Displayable representation of canvas 312A further includes objects referenced 318A, which may include one or more objects that were presented or otherwise referenced during the meeting. In this example, objects referenced 318A include screen share presentation object C 306A, which may have been identified via one or more models included in local context analysis engine 109, context analysis engine 134, and/or entity identification engine 136.

In some examples, observational entity service 132 may determine that separate events should be included in a same canvas. For example, if a plurality of meetings relate to a same subject or subjects, a single canvas may be generated, filled in with data, and/or augmented for those meetings. In other examples, observational entity service 132 may generate and maintain separate canvases for separate events. In additional examples, a user may add notes or objects to the displayable representation of the canvas 312A, and those notes or objects may be saved with the canvas to canvas data store 154. In some examples, a second application may be opened, a user may perform a drag and drop operation input in association with an object from the first application in the canvas, and the object may be input into the surface of the second application.

Figure 3B:
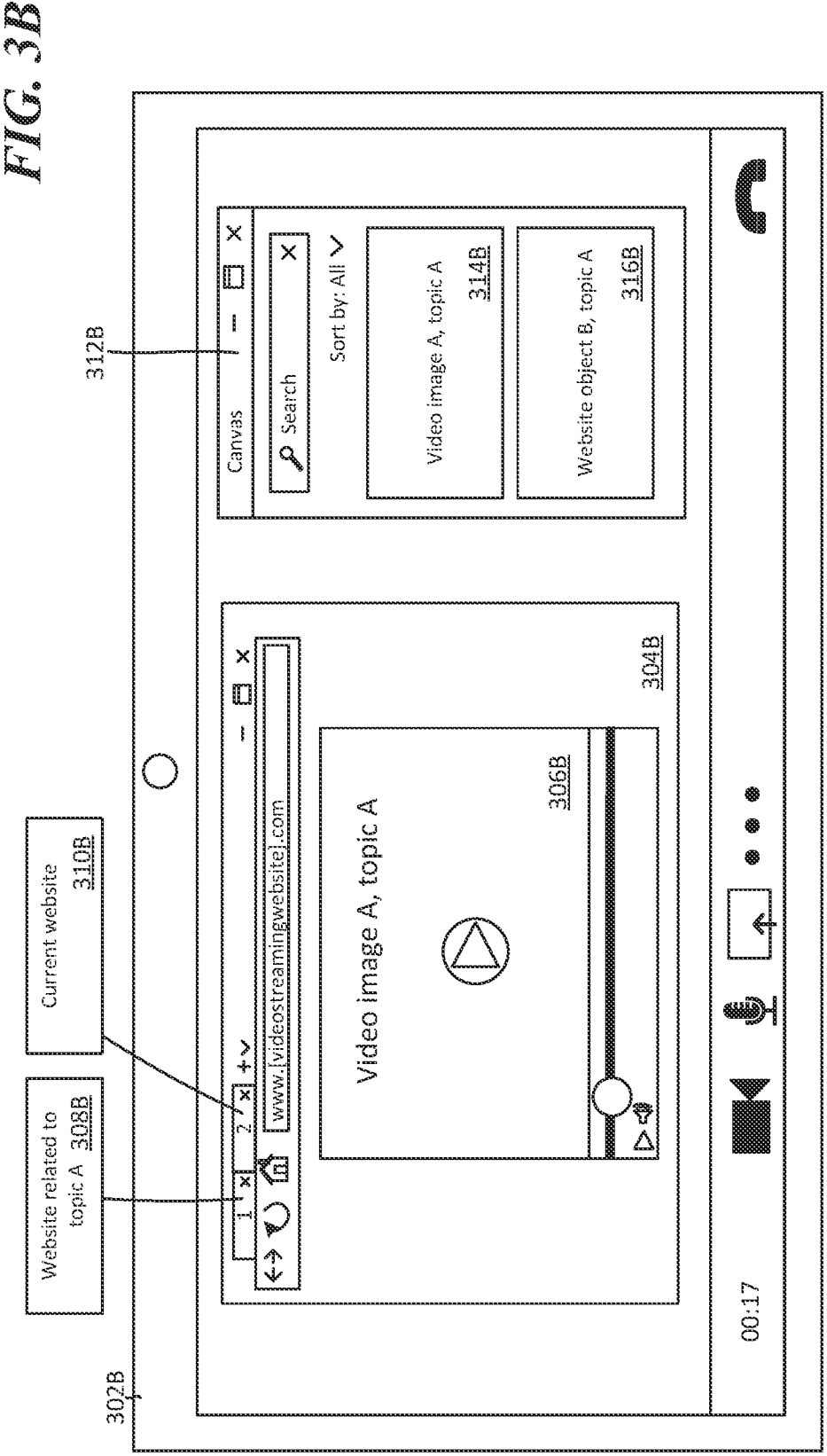
FIG. 3B is a diagram illustrating a computing device and an exemplary user interface for surfacing a displayable representation of a canvas including data related to a web browsing application.

FIG. 3B is a diagram illustrating a computing device 302B and an exemplary user interface for surfacing a displayable representation of a canvas 312B including data related to a web browsing application.

In this example, a user has opened a web browser application as illustrated by application window 304B. A manual input by a user or a triggering event on computing device 302B may have initiated the opening of the displayable representation of canvas 312B, which is populated with objects related to a specific topic (e.g., "topic A"). In this example, the displayable representation of canvas 312B is in the form of a sticky note application or widget. However, it should be understood that a canvas may be surfaced in any variety of displayable forms (e.g., a note taking application, a word processing document, a table format, a presentation document, an HTML document).

Application window 304B includes a web browser application that is currently navigated to current website 310B in tab 2 of the web browser application. Current website 310B is a video streaming website, and a video object 306B is currently being played in application window 304B at the video streaming webpage. The video object 306B includes video image A related to topic A. The web browser application also includes a first tab that a user utilized to open a website related to topic A 308B.

Observational entity service 132 may process observational context data from computing device 302B with local context analysis engine 109 and/or context analysis engine 134. Local context analysis engine 109 and/or context analysis engine 134 may apply context analysis models (e.g., embedding neural networks, image neural network models, audio neural networks, OCR models) to image data and audio data produced by computing device 302B. Thus, local context analysis engine 109 and/or context analysis engine 134 may determine based on that analysis and processing that a web browsing session related to researching a specific topic (e.g., topic A) is currently taking place. Observational entity service may additionally or alternatively receive text data from device input reporting engine 108 in making that determination. Observational entity service 132 may thus determine that the current context type on computing device 302B is a researching specific topic type. The researching specific topic type is included in semantic data structure store 152, and it has a semantic data structure comprising a unique set of entity types associated with it. Specific topic types may have their own unique set of entity types. For example, a travel research type may have a first set of entity types associated with it, a health issue research type may have a second set of entity types associated with it, and an educational topic type may have a third set of entity types associated with it.

Based on the semantic data structure of the researching specific topic type, entity identification engine 136 may identify and extract objects corresponding to the entity types of the researching specific topic type semantic data structure. The extracted objects may be saved to a canvas comprising a searchable data structure of the current context type (e.g., the researching specific topic type). In this example, a displayable representation of the canvas 312B is also displayed by computing device 302B.

Displayable representation of canvas 312B includes first extracted object 314B, which corresponds to an image in video object 306B which relates to topic A. Although only one object from video object 306B is illustrated as being extracted and included displayable representation of canvas 312B it should be understood that observational entity service 132 and/or local context analysis engine 109 may identify, extract, and input into a canvas a plurality of objects that relate to an identified current context type from a webpage or a video object. In some examples, if a determination is made than all or over a threshold amount of a video object relates to a current context type, the entire video object may be added to the canvas. Displayable representation of canvas 312B further includes second extracted object 316B, which also relates to the current context type, and was extracted from the website related to topic A 308A in the first tab of the web browser application. The displayable representation of canvas 312B further includes a search bar which may be utilized to search for objects in the canvas by keyword or phrase. The displayable representation of canvas 312B also includes a sorting user interface element which may be interacted with for sorting objects in the displayable representation of canvas 312B. As examples, the objects may be sorted by size, object type, and/or temporal features (e.g., last added to canvas, first added to canvas, last accessed).

In some examples, observational entity service 132 may determine that separate events should be included in a same canvas. For example, if the web browser application is closed and/or computing device 302B is shut down, and a user subsequently starts another web browsing session having a same current context type (e.g., related to researching the specific topic), observational entity service 132 may simply add to the canvas that was generated during the previous browsing session related to the same context type. In other examples, observational entity service 132 may generate and maintain separate canvases for separate events (e.g., separate browsing sessions). In additional examples, a user may add notes or objects to the displayable representation 312B and those notes or objects may be saved with the canvas to canvas data store 154.

Figure 4:
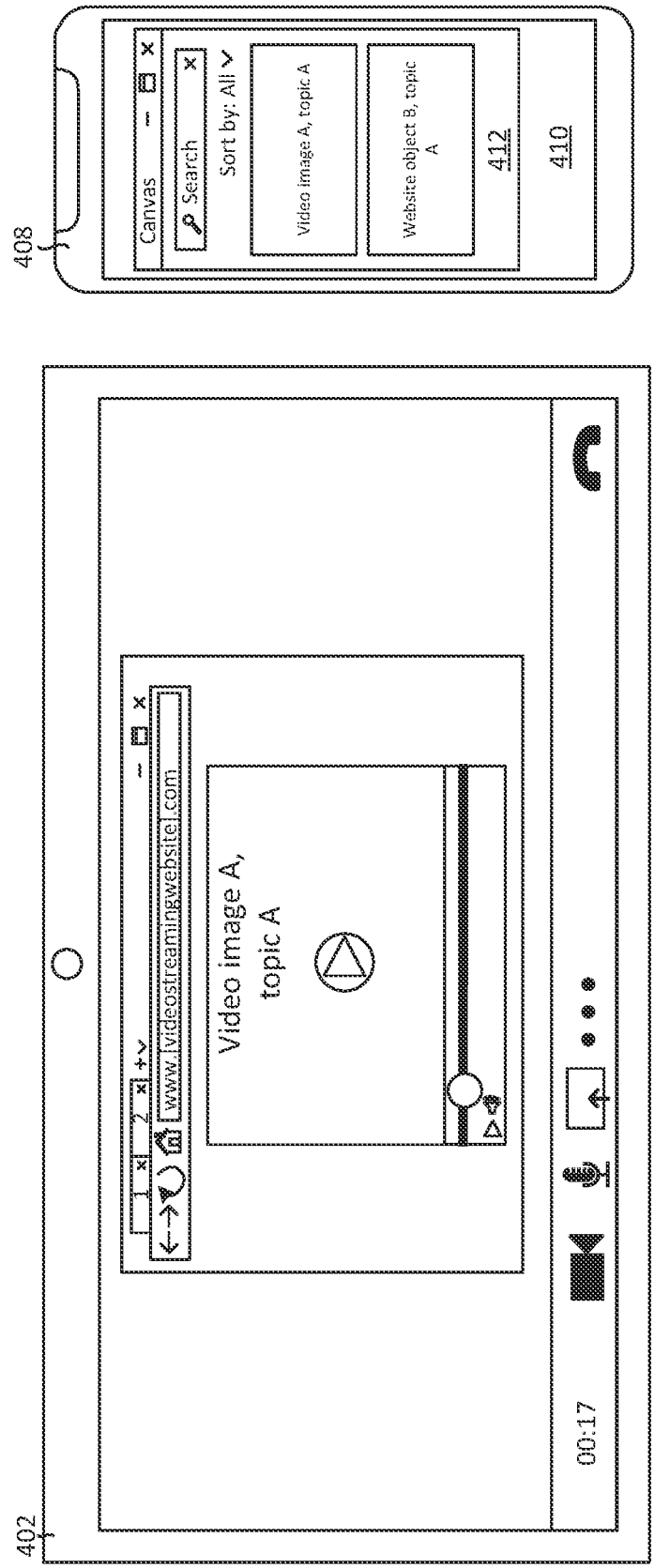
FIG. 4 is a diagram illustrating a first computing device executing a web browser application and a second computing device, connected to the first computing device, that surfaces a displayable representation of a canvas including data related to the web browser application.

FIG. 4 is a diagram illustrating a first computing device 402 executing a web browser application and a second computing device 408, connected to the first computing device, that surfaces a displayable representation of a canvas 412 including data related to the web browser application.

In this example, a determination is made by local context analysis engine 109 and/or context analysis engine 134 of a current context type occurring on first computing device 402. As such, observational entity service 132 generates a canvas for that current context type. However, in this example, a same user account is signed into first computing device 402 and second computing device 408. Further, a determination is made that second computing device 408, which is a mobile computing device, is within a threshold distance of first computing device 402. The determination may be made based on a strength of a wireless connection between second computing device 408 and first computing device 402, and/or one or more sensors (e.g., GPS sensors, camera sensors) included in second computing device 408 and/or first computing device 402. Based on that determination, the displayable representation of the canvas 412 is caused to be displayed on the user interface of second computing device 408 rather than on first computing device 402. In some examples, the displayable representation of the canvas 412 may only be displayed on second computing device 408 upon the determination being made that second computing device 408 and first computing device 402 are within a threshold distance of one another, and the receiving of an interaction with a user interface element asking whether the user would like to have the displayable representation of the canvas 412 displayed on second computing device 408. In additional examples, the displayable representation of the canvas 412 may be displayed on second computing device 408 based at least in part on a limited amount of space on the user interface of first computing device 402 and/or a size of the display of first computing device 402. In additional examples, displayable representation of the canvas 412 may be displayed on second computing device 408 regardless of the distance between first computing device 402 and second computing device 408 if a user input is received to display the displayable representation of the canvas 412 on second computing device 408.

Figure 5:
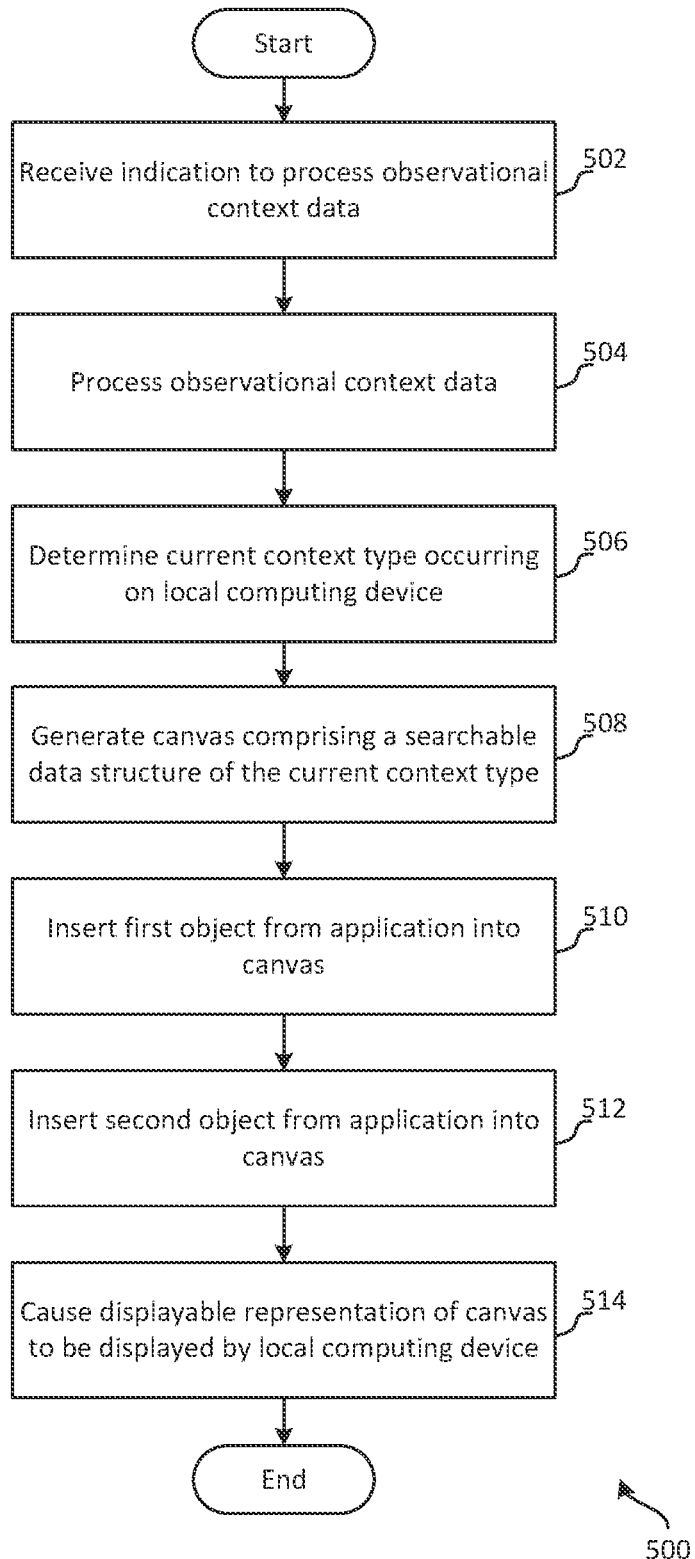
FIG. 5 is an exemplary method for generating searchable data structures using observational context data.

FIG. 5 is an exemplary method for generating searchable data structures using observational context data. The method 500 begins at a start operation and flow moves to operation 502.

At operation 502 an indication to process observational context data surfaced by a local computing device is received, wherein the observational context data comprises data from an application displayed by the local computing device. The indication may comprise one or more triggering events. For example, the indication may comprise the initiation of a meeting in an electronic meeting application, an opening of a new web browser application instance, or the opening of a different application. In other examples, the indication may comprise a manual user input comprising at least one of a selection of a user interface element, and attaching a displayable representation of a canvas to an application. In additional examples, local context analysis engine 109 and/or observational entity service 132 may, if approved via privacy or data processing settings, constantly or periodically receive and process observational context data from the local computing device.

From operation 502 flow continues to operation 504 where the observational context data is processed with a context analysis engine. The observational context data may provide an indication of an activity or intent type that a user is engaging in on the local computing device. The observational context data may comprise text data, voice and audio input data, image data, application data, and/or operating system interaction data. In some examples, processing the observational context data may comprise extracting text from display data with an OCR model. In additional examples, processing the observational context data may comprise classifying an image included in display data with an embedding neural network. In other examples, processing the observational context data may comprise processing audio data by applying a speech-to-text engine to the audio data.

From operation 504 flow continues to operation 506 where a current context type occurring on the local computing device is determined. The current context type is determined from a plurality of context types, and each of the plurality of context types has a semantic data structure comprising a unique set of types associated with a corresponding context type. As examples, a current context type may correspond to an electronic meeting type, a researching type, a researching specific topic type, a web browsing type, a web browsing a specific topic type, a work project type, a work project of a specific topic type, a banking task type, a finance task type, an education task type, a specific class task type, and specific class topic task type, among others.

From operation 506 flow continues to operation 508 where a canvas comprising a searchable data structure of the current context type is generated. In some examples, the canvas may be generated automatically (e.g., by canvas generation engine 144) upon the determination of the current context type being made. In other examples, the canvas may only be generated upon receiving a user input to generate a canvas. The user input may comprise a variety of alternatives. For example, a user may open an application associated with the observational entity service, and that opening may cause the canvas to be generated. In other examples, the user input may comprise an interaction with a user interface button, an application trigger, a voice input, or a snapping of an application associated with observational entity service 132 proximate to another application where context data is being generated.

From operation 508 flow continues to operation 510 where a first object from the application is inserted into the canvas, wherein the first object has a first entity type corresponding to the current context type. The object may comprise a text object, an image object, a video object, or an audio object, for example.

From operation 510 flow continues to operation 512 where a second object from the application is inserted into the canvas, wherein the second object has a second entity type corresponding to the current context type. As described above in relation to operation 510, the object may comprise a text object, an image object, a video object, or an audio object, for example.

From operation 512 flow continues to operation 514 where a displayable representation of the canvas is caused to be displayed by the local computing device, wherein the displayable representation comprises the first object and the second object.

From operation 514 flow moves to an end operation and the method 500 ends.

Figure 6:
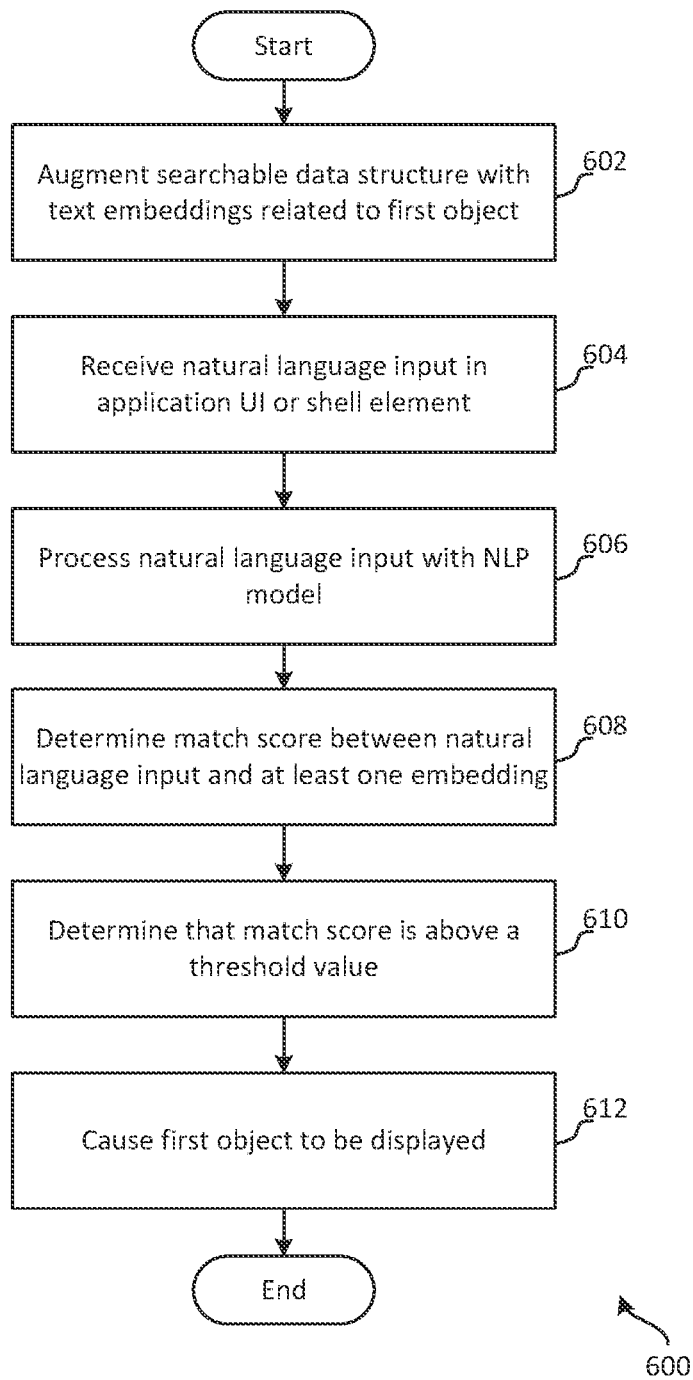
FIG. 6 is an exemplary method for surfacing data from a canvas comprising a searchable data structure in response to processing of a natural language input.

FIG. 6 is an exemplary method 600 for surfacing data from a canvas comprising a searchable data structure in response to processing of a natural language input. The method 600 begins at a start operation and flow continues to operation 602.

At operation 602 a canvas comprising a searchable data structure is augmented with a plurality of text embeddings that are related to a first object included in the canvas. The text embeddings may be within a threshold distance in an embedding matrix from one or more embeddings generated from the first object.

From operation 602 flow continues to operation 604 where a natural language input is received in an application user interface or a shell element, wherein the natural language input is received from a user account associated with a local computing device that the canvas was generated from. The natural language input may comprise a user query or a freeform text input.

From operation 604 flow continues to operation 606 where the natural language input is processed with a natural language processing model. The natural language processing model may comprise a keyword or phrase matching model, an embedding model, and/or a text prediction model.

From operation 606 flow continues to operation 608 where a match score between the natural language input and at least one of the plurality of text embeddings is determined. The match score may be determined based on a closeness (e.g., K nearest neighbor) of an embedding generated for the natural language input and one or more of the plurality of text embeddings in an embedding matrix.

From operation 608 flow continues to operation 610 where a determination is made that the match score is above a threshold value.

From operation 610 flow continues to operation 612 where the first object is caused to be displayed. The first object may be displayed as a response to a user query or as autocomplete text. In some examples, the displayed object may be selected for being input into a surface that it is displayed on.

From operation 612 flow continues to an end operation and the method 600 ends.

Figure 7:
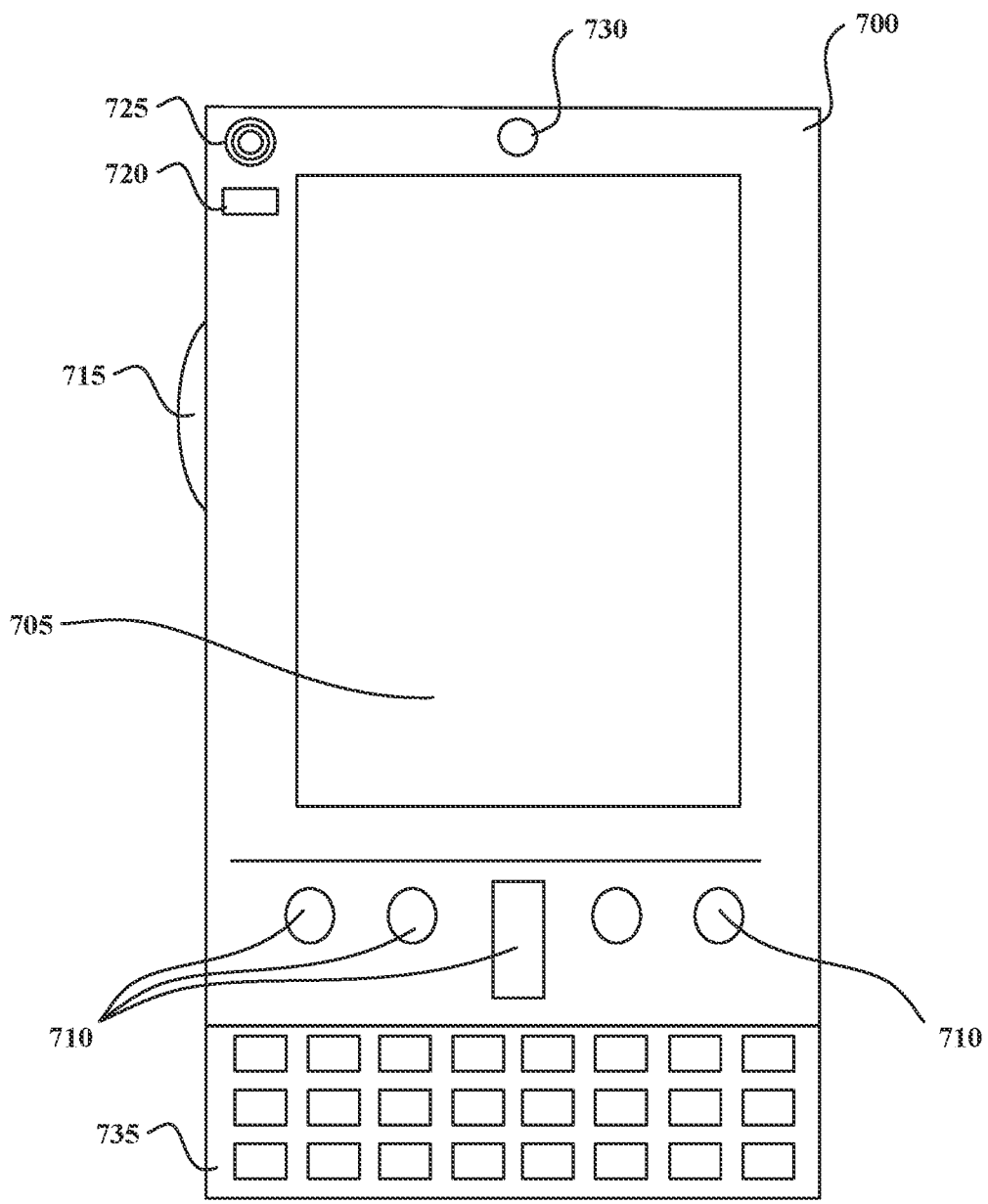
FIGS. 7 and 8 are simplified diagrams of a mobile computing device with which aspects of the disclosure may be practiced.
Figure 8:
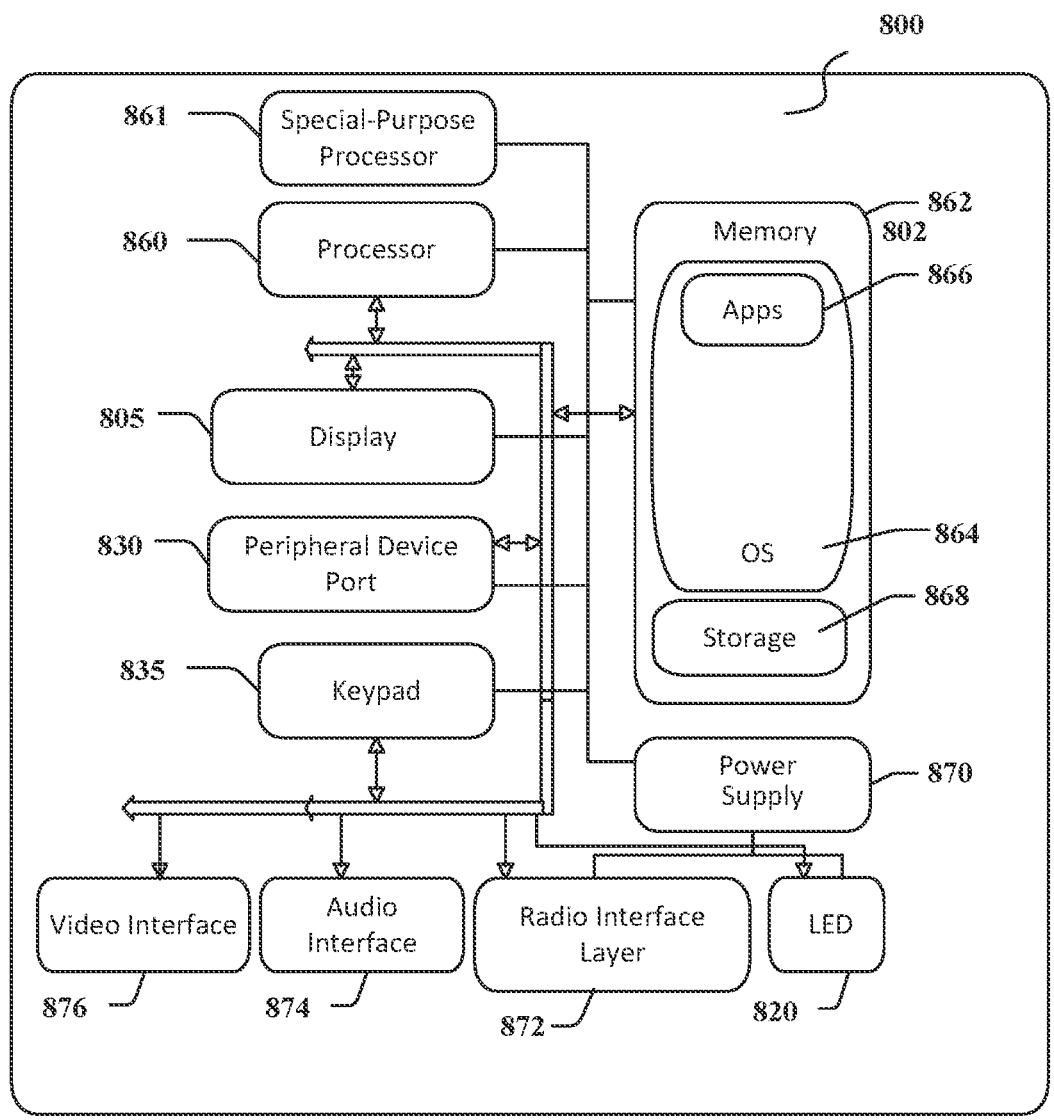

FIGS. 7 and 8 illustrate a mobile computing device 700, for example, a mobile telephone, a smart phone, wearable computer, a tablet computer, an e-reader, a laptop computer, and an augmented reality computer, with which embodiments of the disclosure may be practiced. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or fewer input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 620 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 8 is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including instructions for identifying a target value in a data set.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 720 may be used to provide visual notifications, and/or an audio interface 874 may be used for producing audible notifications via the audio transducer 725. In the illustrated embodiment, the visual indicator 720 is a light emitting diode (LED) and the audio transducer 725 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 730 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8 by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
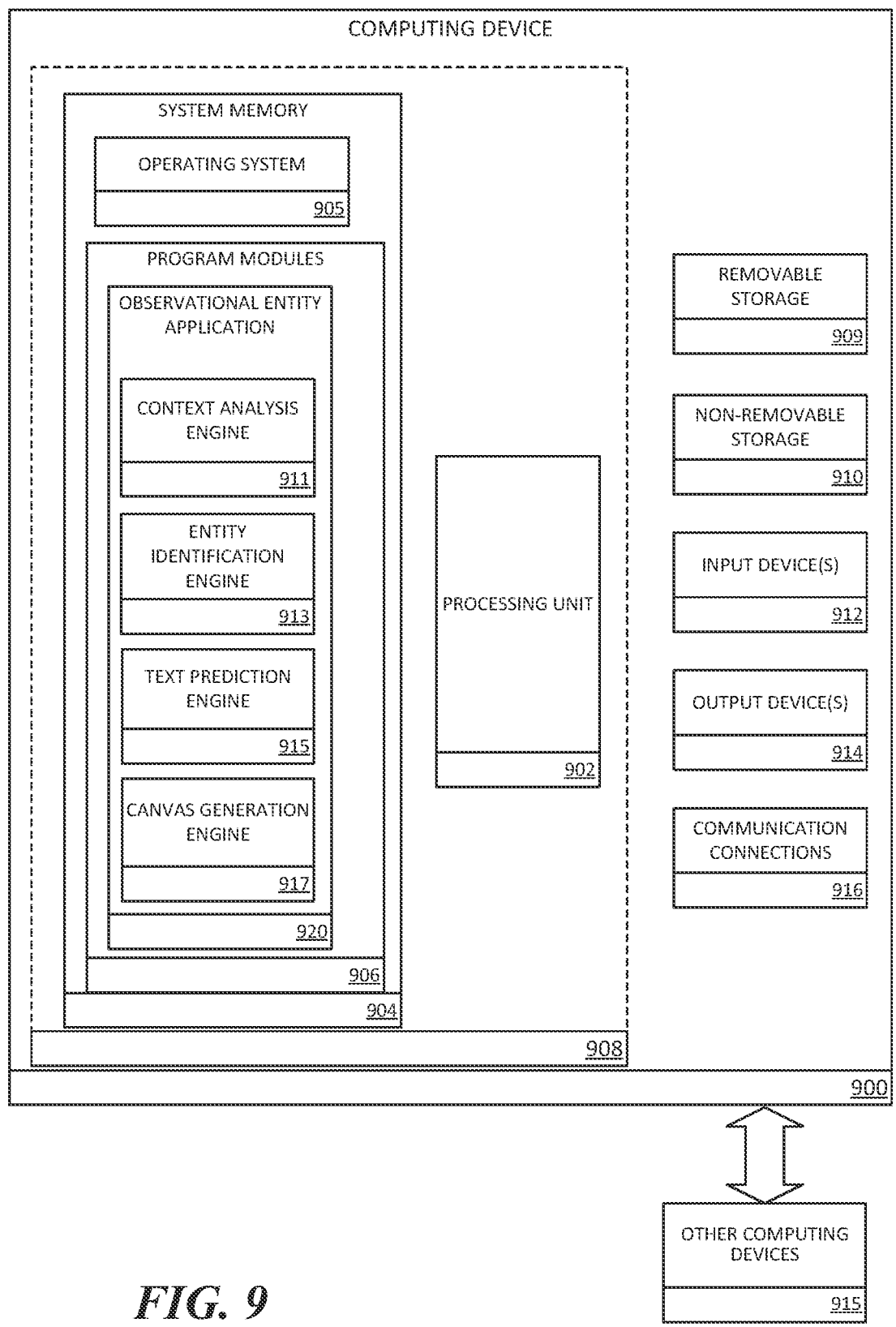
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may have computer executable instructions for generating searchable data structures utilizing observational context data. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 suitable for running one or more productivity application programs. The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., observational entity application 920) may perform processes including, but not limited to, the aspects, as described herein. According to examples, context analysis engine 911 may perform operations associated with determining a context type associated with a local computing device. Entity identification engine 913 may perform operations associated with identifying and extracting data (e.g., text objects, image objects, video objects) corresponding to the entity types for a semantic data structure corresponding to an identified current local context. Text prediction engine 915 may perform operations associated with determining text candidates for surfacing alone or in combination with data included in one or more canvases. Canvas generation engine 917 may perform operations associated with generating a canvas for capturing data associated with a local context type.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 915. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal. Computer storage device does not include a carrier wave or other propagated or modulated data signal. Computer-readable storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10:
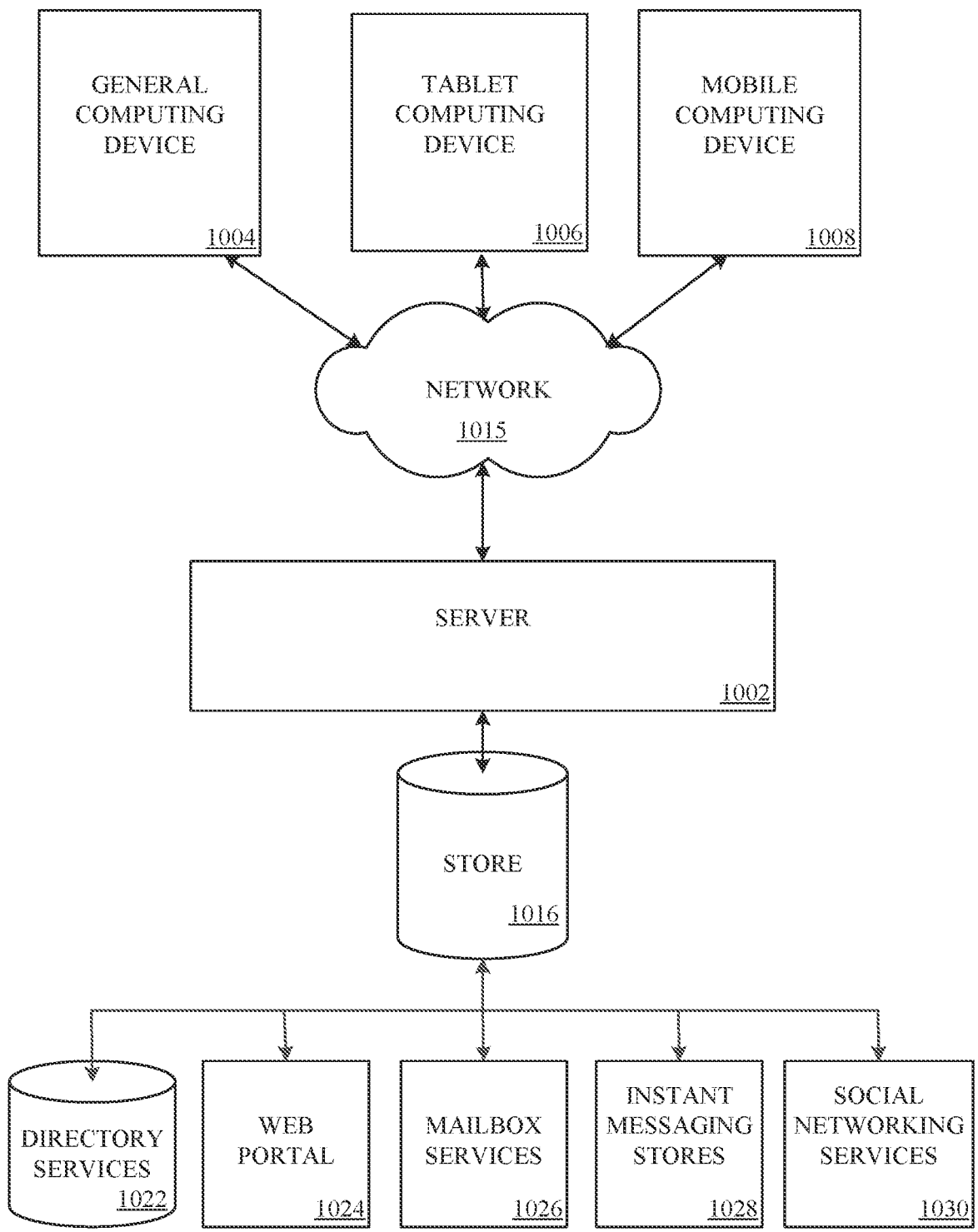
FIG. 10 is a simplified block diagram of a distributed computing system in which aspects of the present disclosure may be practiced.

FIG. 10 illustrates one aspect of the architecture of a system for processing data received at a computing system from a remote source, such as a personal/general computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. The program modules 1006 may be employed by a client that communicates with server device 1002, and/or the program modules 1006 may be employed by server device 1002. The server device 1002 may provide data to and from a client computing device such as a personal/general computer 1004, a tablet computing device 1006 and/or a mobile computing device 1008 (e.g., a smart phone) through a network 1015. By way of example, the computer system described above with respect to FIGS. 7-9 may be embodied in a personal/general computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method comprising:
 receiving an indication to process observational context data surfaced by a local computing device, wherein the observational context data comprises display data from a plurality of applications displayed by the local computing device, and wherein the observational context data provides an indication of an activity performed by a user via graphical user interfaces of the plurality of applications on the local computing device;
 processing the observational context data with a context analysis engine, the processing comprising:
  applying one or more models to the observational context data to identify the activity, and
  determining a current context type occurring on the local computing device based on the activity, wherein:
   the current context type is determined from a plurality of context types, and
   each of the plurality of context types has a semantic data structure comprising a unique set of entity types associated with the corresponding context type;
 generating a canvas comprising a searchable data structure of the current context type, the searchable data structure comprising the unique set of entity types associated with the current context type;
 extracting, from each of the plurality of applications, one or more objects containing data associated with the activity and each of the one or more objects corresponding to an entity type of the unique set of entity types associated with the current context type;
 inserting data comprising the one or more objects into the searchable data structure of the canvas, wherein the data further comprises data associated with the activity; and
 causing a displayable representation of the canvas to be displayed by the local computing device, wherein the displayable representation comprises the one or more objects and a search function for searching the data in the searchable data structure including the data associated with the activity.

2. The computer-implemented method of claim 1, wherein the indication comprises one of: initiation of a meeting in an electronic meeting application, opening of a new web browser application instance, opening of a different user application, a user selection of a user interface element, and attachment of a displayable representation of the canvas to an application prior to the one or more objects being inserted into the canvas.

3. The computer-implemented method of claim 1, wherein:
the one or more objects comprise a first object and a second object;
an entity type of the first object is a first entity type of the unique set of entity types associated with the current context type; and
an entity type of the second object is a second entity type of the unique set of entity types associated with the current context type.

4. The computer-implemented method of claim 1, further comprising augmenting the searchable data structure with a plurality of embeddings that are related to the one or more objects.

5. The computer-implemented method of claim 4, further comprising:
receiving a natural language input in an application user interface or a shell element, wherein the natural language input is received from a user account associated with the local computing device;
processing the natural language input with a natural language processing model;
determining a match score between the natural language input and at least one of the plurality of embeddings;
determining that the match score is above a threshold value; and
causing the related object of the one or more objects to be displayed.

6. The computer-implemented method of claim 4, further comprising:
generating a summary from the observational context data;
saving the summary with the canvas;
matching a natural language input to the summary or one of the plurality of embeddings that are related to the one or more objects; and
causing the summary to be surfaced.

7. The computer-implemented method of claim 1, further comprising:
opening, by the local computing device, a second application;
receiving a drag and drop operation input in association with one of the one or more objects in the displayable representation of the canvas; and
causing the one of the one or more objects to be input into a surface of the second application.

8. The computer-implemented method of claim 1, wherein processing the observational context data with the context analysis engine further comprises extracting text from the display data with an optical character recognition ("OCR") model.

9. The computer-implemented method of claim 1, wherein processing the observational context data with the context analysis engine further comprises classifying an image included in the display data with an embedding neural network.

10. The computer-implemented method of claim 1, wherein:
the observational context data further comprises audio data received by the local computing device; and
processing the observational context data with the context analysis engine further comprises applying a speech-to-text engine to the audio data.

11. The computer-implemented method of claim 1, further comprising:
receiving telemetry data comprising observational context data from a plurality of computing devices;
determining from the telemetry data that a new semantic data structure should be created for a new corresponding context type;
receiving a manual input to label the new semantic data structure; and
creating a new context type with the new semantic data structure.

12. A system comprising:
a memory for storing executable program code; and
a processor, functionally coupled to the memory, the processor being responsive to computer-executable instructions contained in the program code and operative to:
receive an indication to process observational context data surfaced by a local computing device, wherein the observational context data comprises display data from an application displayed by the local computing device, and wherein the observational context data provides an indication of an activity performed by a user via a graphical user interface of the application on the local computing device;
process the observational context data with a context analysis engine, wherein the instructions to process are further operative to:
apply one or more models to the observational context data to identify the activity; and
determine a current context type occurring on the local computing device based on the activity, wherein:
the current context type is determined from a plurality of context types, and
each of the plurality of context types has a semantic data structure comprising a unique set of entity types associated with the corresponding context type;
generate a canvas comprising a searchable data structure of the current context type, the searchable data structure comprising the unique set of entity types associated with the current context type;
extract, from the application, one or more objects containing data associated with the activity and each corresponding to an entity type of the unique set of entity types associated with the current context type;
insert data comprising the one or more objects into the searchable data structure of the canvas, wherein the data further comprises data associated with the activity; and
cause a displayable representation of the canvas to be displayed by the local computing device simultaneously with the application, wherein the displayable representation comprises the one or more objects and a search function for searching the data in the searchable data structure including the data associated with the activity.

13. The system of claim 12, wherein the indication comprises at least one of: initiation of a meeting in an electronic meeting application, opening of a new web browser application instance, opening of a different user application, a user selection of a user interface element, and attaching the displayable representation of the canvas to the application prior to the one or more objects being inserted into the canvas.

14. The system of claim 12, wherein the processor is further responsive to the computer-executable instructions contained in the program code and operative to:

augment the searchable data structure with a plurality of text embeddings that are related to the one or more objects.

15. The system of claim 14, wherein the processor is further responsive to the computer-executable instructions contained in the program code and operative to:
    receive a natural language input in an application user interface or shell element, wherein the natural language input is received from a user account associated with the local computing device;
    process the natural language input with a natural language processing model;
    determine a match score between the natural language input and at least one of the plurality of text embeddings;
    determine that the match score is above a threshold value; and
    cause the related object of the one or more objects to be displayed.

16. The system of claim 12, wherein:
    the observational context data further comprises audio data received by the local computing device; and
    in processing the observational context data with the context analysis engine, the processor is further responsive to the computer-executable instructions contained in the program code and operative to:
        apply a speech-to-text engine to the audio data.

17. The system of claim 12, wherein the processor is further responsive to the computer-executable instructions contained in the program code and operative to:
    determine that a mobile computing device associated with a user account signed into the local computing device is within a threshold distance of the local computing device; and
    cause the displayable representation of the canvas to be displayed by the mobile computing device.

18. A computer-readable storage device comprising executable instructions that, when executed by a processor, assist with generating searchable data structures using observational context data, the computer-readable storage device including instructions executable by the processor for:
    processing the observational context data with a context analysis engine, wherein the observational context data provides an indication of an activity performed by a user via a graphical user interface of an application on a local computing device executing the executable instructions, and wherein the processing comprises:
        applying one or more models to the observational context data to identify the activity, and
        determining a current context type occurring on a local computing device based on the activity, wherein:
            the current context type is determined from a plurality of context types, and
            each of the plurality of context types has a semantic data structure comprising a unique set of entity types associated with the corresponding context type;
    generating a canvas comprising a searchable data structure of the current context type, the searchable data structure comprising the unique set of entity types associated with the current context type;
    extracting, from the application generating the observational context data, one or more objects containing data associated with the activity and each of the one or more objects corresponding to an entity type of the unique set of entity types associated with the current context type;
    inserting data comprising the one or more objects into the searchable data structure of the canvas, wherein the data further comprises data associated with the activity; and
    causing a displayable representation of the canvas to be displayed by the local computing device simultaneously with the application, wherein the displayable representation comprises the one or more objects and a search function for searching the data in the searchable data structure including the data associated with the activity.

19. The computer-readable storage device of claim 18, wherein the observational context data is processed in response to an indication that comprises one of: initiating of a meeting in an electronic meeting application, opening of a new web browser application instance, opening of a different user application, a user selection of a user interface element, and attaching the displayable representation of the canvas to an application prior to the object being inserted into the canvas.

20. The computer-readable storage device of claim 18, wherein the observational context data further comprises:
    audio data received by the local computing device; and
    text data received from a device input reporting engine executed by the local computing device.

* * * * *